US012609835B2

(12) United States Patent
Järvinen et al.

(10) Patent No.: US 12,609,835 B2
(45) Date of Patent: Apr. 21, 2026

(54) APPLYING CHANGESET WITH IMPROVED CYBER SECURITY

(71) Applicant: ABB Schweiz AG, Baden (CH)

(72) Inventors: Pekka Järvinen, Stockholm (SE); Tapio Loponen, Helsinki (FI); Mika Hiltunen, Helsinki (FI)

(73) Assignee: ABB Schweiz AG, Baden (CH)

( * ) Notice: Subject to any disclaimer, the term of this patent is extended or adjusted under 35 U.S.C. 154(b) by 58 days.

(21) Appl. No.: 18/637,638

(22) Filed: Apr. 17, 2024

(65) Prior Publication Data

US 2024/0406005 A1      Dec. 5, 2024

(30) Foreign Application Priority Data

May 30, 2023    (EP) ..................................... 23176016

(51) Int. Cl.
  *H04L 9/32*          (2006.01)
  *H04L 9/08*          (2006.01)
(52) U.S. Cl.
  CPC .......... H04L 9/3247 (2013.01); H04L 9/0825 (2013.01)
(58) Field of Classification Search
  CPC ............................ H04L 9/3247; H04L 9/0825
  See application file for complete search history.

(56) References Cited

U.S. PATENT DOCUMENTS 8,589,020 B1    11/2013  Angus et al.
11,477,012 B2 * 10/2022  Visoky .................. H04L 9/3247

2018/0131520 A1    5/2018  Brockhaus et al.
2022/0086218 A1 *  3/2022  Sabella .................. H04M 15/66
2024/0111273 A1 *  4/2024  Batcher .................. G06Q 10/08
2024/0273411 A1 *  8/2024  Mueck .................. H04L 9/3263

FOREIGN PATENT DOCUMENTS

EP          3511858 A1      7/2019

OTHER PUBLICATIONS

European Search Report; Application No. EP 23 17 6016; Completed: Nov. 10, 2023; 3 Pages.

* cited by examiner

*Primary Examiner* — Kristie D Shingles

(74) *Attorney, Agent, or Firm* — Whitmyer IP Group LLC

(57)          ABSTRACT

A method includes receiving, by an industrial automation device, a first changeset with a first digital signature generated using a private key, wherein the first changeset includes a data package for modifying a configuration or a state of the industrial automation device; verifying, by the industrial automation device, the first digital signature of the first changeset based on a pre-stored public key corresponding to the private key; obtaining, by the industrial automation device, an approval for applying the first changeset in response to verifying the first digital signature of the first changeset, wherein the approval is obtained by finding a pre-stored approval token corresponding to the first changeset, or by receiving a user input indicating the approval; and applying, by the industrial automation device, the first changeset in response to obtaining the approval.

13 Claims, 7 Drawing Sheets

| 501 | Receive first changeset with first digital signature |
| 502 | Verify first digital signature |
| 503 | Obtain approval for applying first changeset |
| 504 | Apply first changeset |

700

APPLYING CHANGESET WITH IMPROVED CYBER SECURITY

TECHNICAL FIELD

The following example embodiments relate to industrial automation and to cyber security.

BACKGROUND

In industrial automation devices, incorrect configurations may cause safety issues and/or damage to the industrial automation device. Thus, it is desirable to apply changes to the configurations in a secure manner.

SUMMARY

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an industrial automation device comprising at least one processor, and at least one memory storing instructions which, when executed by the at least one processor, cause the industrial automation device at least to: receive a first changeset with a first digital signature generated using a private key, wherein the first changeset includes a data package for modifying a configuration or a state of the industrial automation device; verify the first digital signature of the first changeset based on a pre-stored public key corresponding to the private key; obtain an approval for applying the first changeset in response to verifying the first digital signature of the first changeset, wherein the approval is obtained by finding a pre-stored approval token corresponding to the first changeset, or by receiving a user input indicating the approval; and apply the first changeset in response to obtaining the approval.

According to another aspect, there is provided an industrial automation device comprising means for receiving a first changeset with a first digital signature generated using a private key, wherein the first changeset comprises a data package for modifying a configuration or a state of the industrial automation device; means for verifying the first digital signature of the first changeset based on a pre-stored public key corresponding to the private key; means for obtaining an approval for applying the first changeset in response to verifying the first digital signature of the first changeset, wherein the approval is obtained by finding a pre-stored approval token corresponding to the first changeset, or by receiving a user input indicating the approval; and means for applying the first changeset in response to obtaining the approval.

According to another aspect, there is provided a method including: receiving, by an industrial automation device, a first changeset with a first digital signature generated using a private key, wherein the first changeset includes a data package for modifying a configuration or a state of the industrial automation device; verifying, by the industrial automation device, the first digital signature of the first changeset based on a pre-stored public key corresponding to the private key; obtaining, by the industrial automation device, an approval for applying the first changeset in response to verifying the first digital signature of the first changeset, wherein the approval is obtained by finding a pre-stored approval token corresponding to the first changeset, or by receiving a user input indicating the approval; and applying, by the industrial automation device, the first changeset in response to obtaining the approval.

According to another aspect, there is provided a computer program comprising instructions which, when executed by an industrial automation device, cause the industrial automation device to perform at least the following: receiving a first changeset with a first digital signature generated using a private key, wherein the first changeset comprises a data package for modifying a configuration or a state of the industrial automation device; verifying the first digital signature of the first changeset based on a pre-stored public key corresponding to the private key; obtaining an approval for applying the first changeset in response to verifying the first digital signature of the first changeset, wherein the approval is obtained by finding a pre-stored approval token corresponding to the first changeset, or by receiving a user input indicating the approval; and applying the first changeset in response to obtaining the approval.

According to another aspect, there is provided a computer readable medium comprising program instructions for causing an industrial automation device to perform at least the following: receiving a first changeset with a first digital signature generated using a private key, wherein the first changeset comprises a data package for modifying a configuration or a state of the industrial automation device; verifying the first digital signature of the first changeset based on a pre-stored public key corresponding to the private key; obtaining an approval for applying the first changeset in response to verifying the first digital signature of the first changeset, wherein the approval is obtained by finding a pre-stored approval token corresponding to the first changeset, or by receiving a user input indicating the approval; and applying the first changeset in response to obtaining the approval.

According to another aspect, there is provided a non-transitory computer readable medium comprising program instructions for causing an industrial automation device to perform at least the following: receiving a first changeset with a first digital signature generated using a private key, wherein the first changeset includes a data package for modifying a configuration or a state of the industrial automation device; verifying the first digital signature of the first changeset based on a pre-stored public key corresponding to the private key; obtaining an approval for applying the first changeset in response to verifying the first digital signature of the first changeset, wherein the approval is obtained by finding a pre-stored approval token corresponding to the first changeset, or by receiving a user input indicating the approval; and applying the first changeset in response to obtaining the approval.

According to another aspect, there is provided a system comprising at least a cloud service, an edge gateway, and an industrial automation device. The cloud service comprises: means for generating a first changeset for the industrial automation device, wherein the first changeset comprises a data package for modifying a configuration or a state of the industrial automation device; means for generating a first digital signature for the first changeset using a private key; and means for transmitting, to the edge gateway, the first changeset with the first digital signature. The edge gateway comprises: means for receiving, from the cloud service, the first changeset with the first digital signature; and means for transmitting, to the industrial automation device, the first changeset with the first digital signature. The industrial automation device comprises: means for receiving, from the edge gateway, the first changeset with the first digital signature; means for verifying the first digital signature of the first changeset based on a pre-stored public key corresponding to the private key; means for obtaining an approval for applying the first changeset in response to verifying the first digital signature of the first changeset, wherein the approval is obtained by finding a pre-stored approval token corresponding to the first changeset, or by receiving a user input indicating the approval; and means for applying the first changeset in response to obtaining the approval.

According to another aspect, there is provided a system including at least a cloud service, an edge gateway, and an industrial automation device. The cloud service is configured to: generate a first changeset for the industrial automation device, wherein the first changeset includes a data package for modifying a configuration or a state of the industrial automation device; generate a first digital signature for the first changeset using a private key; and transmit, to the edge gateway, the first changeset with the first digital signature. The edge gateway is configured to: receive, from the cloud service, the first changeset with the first digital signature; and transmit, to the industrial automation device, the first changeset with the first digital signature. The industrial automation device is configured to: receive, from the edge gateway, the first changeset with the first digital signature; verify the first digital signature of the first changeset based on a pre-stored public key corresponding to the private key; obtain an approval for applying the first changeset in response to verifying the first digital signature of the first changeset, wherein the approval is obtained by finding a pre-stored approval token corresponding to the first changeset, or by receiving a user input indicating the approval; and apply the first changeset in response to obtaining the approval.

BRIEF DESCRIPTION OF DRAWINGS

In the following, various example embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Different embodiments and examples are described below using single units, models, equipment and memory, without restricting the embodiments/examples to such a solution. Concepts called cloud computing and/or virtualization may be used. Virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN) may cause one or more of the functionalities described below to be migrated to any corresponding abstraction or apparatus or device. Therefore, all words and expressions should be interpreted broadly, and they are intended to illustrate, not to restrict, the example embodiments.

Figure 1:
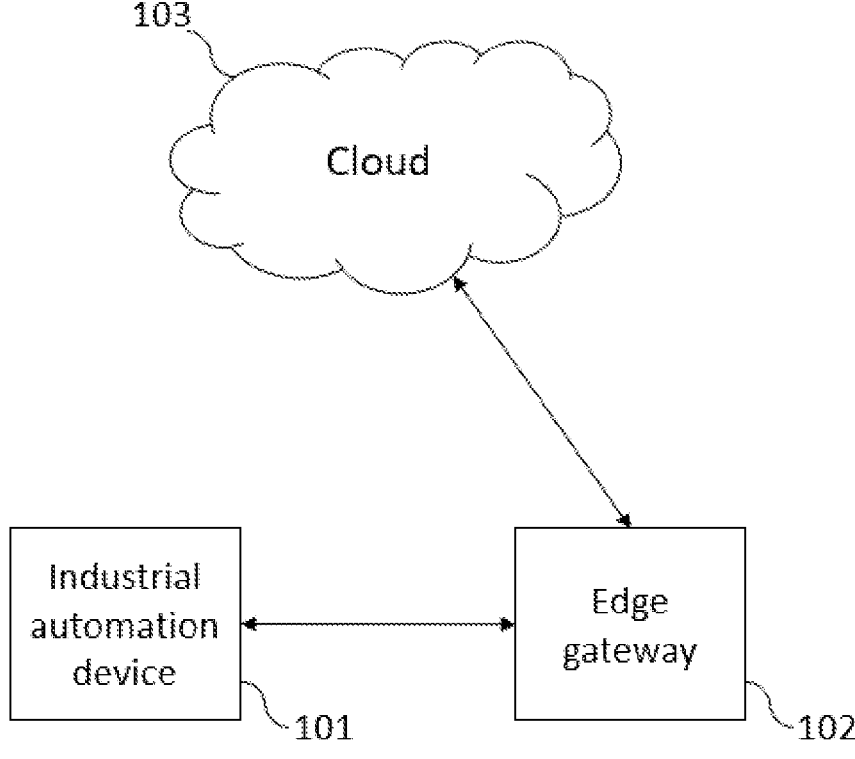
FIG. 1 illustrates an example of a system.

FIG. 1 illustrates an example of a communication system, to which some example embodiments may be applied. Referring to FIG. 1, some example embodiments may be based on wired or wireless communication. Some examples of wireless communication technologies include but are not limited to: 3G (third generation), 4G (fourth generation), LTE (long term evolution), LTE-A (long term evolution advanced), 5G (fifth generation), 5G NR (new radio), 6G (sixth generation), UMTS (universal mobile telecommunications system), EDGE (enhanced data rates for GSM evolution), WCDMA (wideband code division multiple access), Bluetooth, WLAN (wireless local area network), Wi-Fi, Li-Fi (light fidelity), or any other mobile or wireless network. The communication may also occur between nodes belonging to different but compatible systems, such as LTE and 5G. Alternatively, or additionally, some example embodiments may be based on a wired communication protocol, such as Ethernet.

It should be noted that FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the system may also comprise other functions and structures. It should be appreciated that the functions, structures, elements, and protocols used in or for communication are irrelevant to the example embodiments. Therefore, they need not be discussed in more detail here.

Referring to FIG. 1, the system comprises at least an industrial automation device 101, an edge gateway 102, and a cloud service 103.

Some example embodiments provide a method for securely uploading and applying changesets to the industrial automation device 101. A changeset may be defined as any data package for modifying the current configuration or state of the industrial automation device 101. In other words, some example embodiments may enable secure configuration modifications to the industrial automation device 101.

For example, the changeset may comprise at least one of: a category of the changeset, one or more commands, and/or metadata. The metadata may comprise, for example, text for user interface and/or one or more logs.

A non-limiting example of the metadata is provided in the following:

```
Category: parameterization;
Metadata: { description: "Changing these parameters: x.y to 123
and z.w to 321 will reduce unwanted warning at process stop",
timestamp: "2021-23-02 16:08", info_url: https://...}
```

For example, the industrial automation device 101 may be required to comply with IEC 62443-4-2 SL4. IEC 62443-4-2 SL4 is a security standard for industrial automation and control systems (IACS) published by the International Electrotechnical Commission (IEC). It specifies the requirements for implementing and maintaining the security of IACS at security level 4 (SL4) in the IEC 62443 security framework. Security level 4 is the highest level of security in the IEC 62443 framework, and it is intended for systems that are considered to be critical to national security, public safety, or the environment. These systems may be high-value targets for attackers, and the consequences of a successful attack can be severe. The IEC 62443-4-2 SL4 standard provides guidance for implementing security controls and practices to protect IACS at this high level of security. It covers topics such as risk assessment, security policies and procedures, access control, network security, system hardening, and incident response. Compliance with the IEC 62443-4-2 SL4 standard can help organizations to ensure the security of their critical IACS systems, reduce the risk of cyber attacks, and meet regulatory requirements. For example, regarding CR 2.1 authorization enforcement, requirement enhancement RE 4 may specify a "dual approval" requirement, when an action can result in serious impact to the industrial process.

The changeset may be deployed to the industrial automation device 101 over a remote connection initiated from the cloud service 103 and terminating at the industrial automation device 101. The cloud service 103 may communicate with the industrial automation device 101 via the edge gateway 102. Alternatively, the cloud service 103 may communicate directly with the industrial automation device 101. Advanced services may provide mechanisms to suggest and apply changesets over the remote connection from the cloud service 103.

The authenticity of the changeset may be verified at the last possible stage, for example at a control unit of the industrial automation device 101, by verifying the digital signature of the changeset against a pre-stored public key. Furthermore, the actual applying of the changeset may be approved through either user interaction or a pre-stored approval token.

A digital signature is a cryptographic technique that is used to verify the authenticity and integrity of digital data, such as the changeset. The digital signature provides a way to ensure that the data has not been tampered with or altered during transmission. The digital signature may be created using a combination of hashing and asymmetric encryption. The digital signature may be generated using a hash function to generate a unique value that represents the data being signed. The hash function is a mathematical algorithm that takes input data and produces a fixed-length output value that is unique to that data. A private key may then be used to encrypt the hash value, thus generating the digital signature. The private key is known only to the signer (e.g., the cloud service 103) and is kept secret. The resulting digital signature can be attached to the changeset being signed and transmitted to the industrial automation device 101.

To verify the digital signature, the industrial automation device 101 uses the sender's public key to decrypt the digital signature and obtain the hash value. The industrial automation device 101 then applies the same hash function to the original data to generate a new hash value. If the two hash values match, it means that the data has not been tampered with and that the digital signature is authentic (i.e., the digital signature is verified). In public-key cryptography, the private key is kept secret by the owner (e.g., the cloud service 103) and the public key may be freely available to anyone who wants to send or receive an encrypted message to or from the owner.

The industrial automation device 101 may comprise, for example, at least one of: a frequency converter, variable frequency drive, variable speed drive, motion drive, motion controller, motor, servomotor, AC/DC module, DC/AC module, DC/DC module, programmable logic controller (PLC), switch, soft starter, robot, or any other device used for industrial automation. For example, a variable frequency drive or a variable speed drive may be used to run machinery, such as a motor or a pump, at different speeds. The industrial automation device 101 may comprise or be connected to a controller, for example a proportional-integral-derivative (PID) controller. The controller may be configured to send control signals to the industrial automation device 101. The industrial automation device 101 may control highly dynamic industrial processes, in which for example the speed or torque applied to a motor has to be varied according to the needs of the industrial process.

The industrial automation device 101 may store, for example in an internal memory of the industrial automation device or in an external memory, information on control parameter settings, for example present values of control parameters such as controller gains, ramp times, motor data, limits, magnetization settings, signal filtering settings, and/or motor control settings. The industrial automation device 101 may also store operational information recorded during the operation of the industrial automation device, for example information on key performance indicators, such as load current histogram, torque ripple, torque vs. speed curves, and/or power vs. speed curves, temperature, voltage, current, and/or other information such as resonance frequencies and/or load inertias.

The industrial automation device 101 may comprise a communication interface providing a connection to the edge gateway 102. The connection between the industrial automation device 101 and the edge gateway 102 may be provided, for example, by Bluetooth, Bluetooth low energy, ZigBee, wireless local area network (WLAN or WiFi), wireless mesh network, near field communication (NFC), light fidelity (Li-Fi), Ethernet, or any other wireless or wired connection. The industrial automation device 101 may be configured to exchange information, i.e., to transmit and/or receive data, with the edge gateway 102 via the connection. For example, the industrial automation device 101 may be configured to apply configuration changes received via the edge gateway 102.

The edge gateway 102, also known as an Internet of Things (IoT) gateway, is a device that acts as a bridge between devices (e.g., the industrial automation device 101) or sensors at the edge of a network and the cloud service 103. The edge gateway 102 serves as a point of aggregation, control, and analysis for data that is generated by the industrial automation device 101. The primary function of the edge gateway 102 is to collect and process data from devices such as the industrial automation device 101, and to transmit the data to the cloud service 103 for further analysis and storage. This can help to reduce the amount of data that needs to be transmitted over the network, as the edge gateway 102 can perform filtering and processing on the data locally before transmitting it to the cloud service 103. The edge gateway 102 may also provide additional functionality and services, such as security, device management, and analytics. These may include features such as local storage, protocol translation, and data transformation, and may support various communication protocols and standards, such as Message Queuing Telemetry Transport (MQTT), Hypertext Transfer Protocol (HTTP), and Constrained Application Protocol (CoAP).

The edge gateway 102 may be a local device located on-site at a close proximity to the industrial automation device 101. The edge gateway 102 is equipped with a communication interface to provide the connection to the industrial automation device 101 for example via Bluetooth, Bluetooth low energy, ZigBee, wireless local area network (WLAN or WiFi), wireless mesh network, near field communication (NFC), light fidelity (Li-Fi), Ethernet, or any other wireless or wired connection.

Furthermore, the edge gateway 102 may be connected to the internet via a network interface, such as 3G, 4G, LTE, LTE-A, 5G, 5G NR, 6G, UMTS, EDGE, WCDMA, WLAN, Wi-Fi, Li-Fi, Ethernet, or any other mobile, wireless or wired network.

Alternatively, the industrial automation device 101 may be directly connected to the cloud service 103 via a network interface, such as 3G, 4G, LTE, LTE-A, 5G, 5G NR, 6G, UMTS, EDGE, WCDMA, WLAN, Wi-Fi, Li-Fi, or any other mobile, wireless or wired network.

The cloud service 103 is a type of service that provides computing resources and functionality over the internet or a private network. Cloud services allow users to access computing resources and services without having to build or maintain the infrastructure themselves. Cloud services are hosted and maintained by a cloud provider, who is responsible for managing the underlying infrastructure and ensuring the availability and reliability of the service. The cloud service 103 may be configured to exchange information, i.e., to transmit and/or receive data, with the industrial automation device 101, either directly or via the edge gateway 102.

In an example embodiment, the cloud service 103 may be configured to or comprise means for performing at least the following: generating a first changeset for the industrial automation device 101, wherein the first changeset comprises a data package for modifying a configuration or a state of the industrial automation device 101; generating a first digital signature for the first changeset using a private key; and transmitting, to the edge gateway 102, the first changeset with the first digital signature.

The edge gateway 102 may be configured to or comprise means for performing at least the following: receiving, from the cloud service 103, the first changeset with the first digital signature; and transmitting, to the industrial automation device 101, the first changeset with the first digital signature.

The industrial automation device 101 may be configured to or comprise means for performing at least the following: receiving, from the edge gateway 102, the first changeset with the first digital signature; verifying the first digital signature of the first changeset based on a pre-stored public key corresponding to the private key; obtaining an approval for applying the first changeset in response to verifying the digital signature of the first changeset; and applying the first changeset in response to obtaining the approval.

Figure 2:
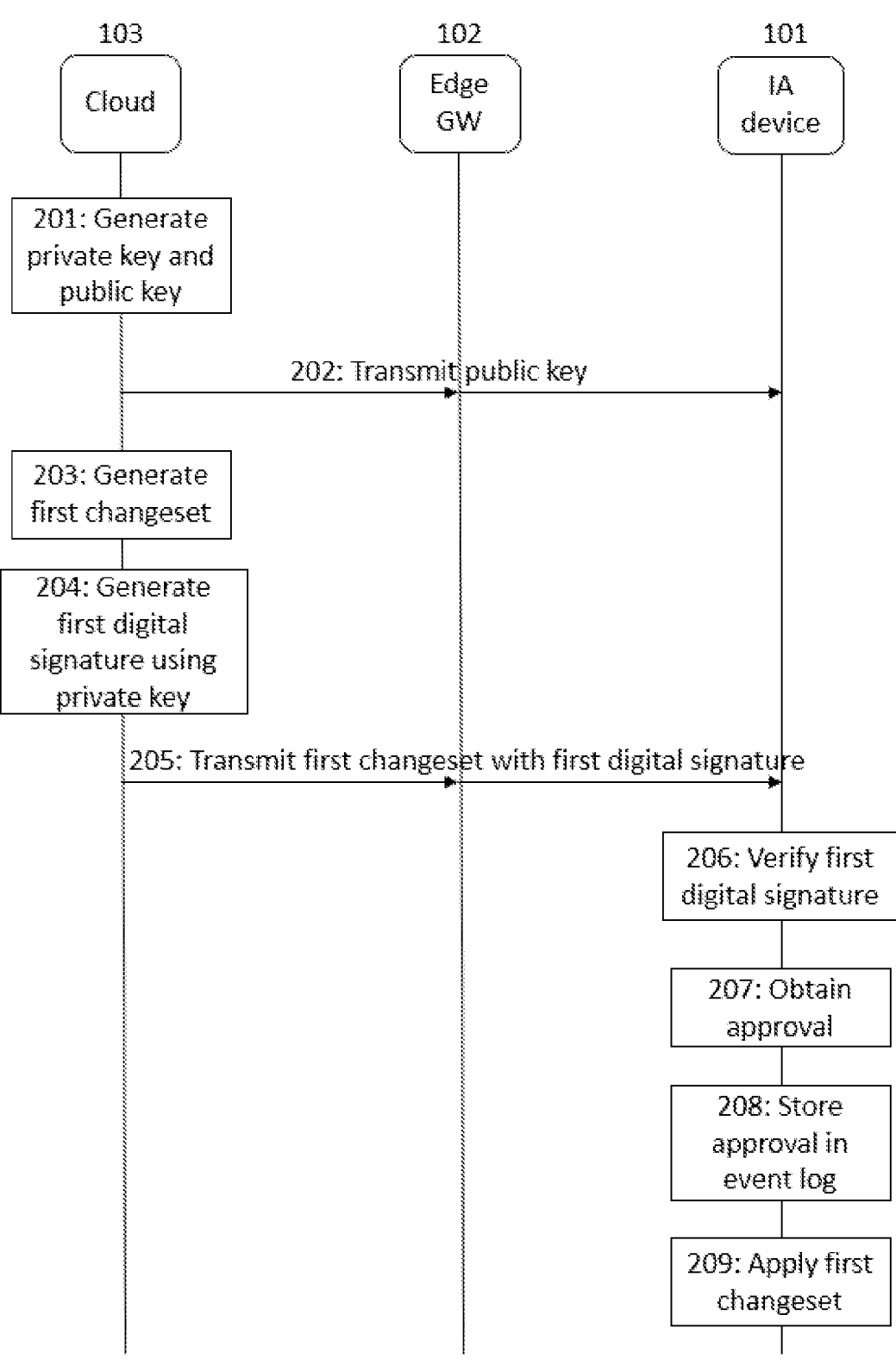
FIG. 2 illustrates a signal flow diagram.

FIG. 2 illustrates a signal flow diagram according to an example embodiment.

Referring to FIG. 2, at 201, the cloud service 103 generates an authentication key pair comprising a private key and a public key. The private key may be stored securely at the cloud service 103.

At 202, the cloud service 103 transmits the public key to the industrial automation (IA) device 101 via the edge gateway (GW) 102. For example, the public key may be delivered as plaintext to the industrial automation device 101 and stored at the industrial automation device 101.

At 203, the cloud service 103 generates a first changeset for the industrial automation device 101, wherein the first changeset comprises a data package for modifying a configuration or a state of the industrial automation device 101.

At 204, the cloud service 103 generates a first digital signature for the first changeset using the private key. In other words, the first changeset is signed with the private key. As mentioned above, the public key corresponding to the private key is stored at the industrial automation device 101.

At 205, the cloud service 103 transmits the first changeset with the first digital signature to the industrial automation device 101 via the edge gateway 102. In other words, the cloud service 103 transmits the first changeset with the first digital signature to the edge gateway 102 connected to the cloud service 103, and the edge gateway 102 transmits the first changeset with the first digital signature to the industrial automation device 101. Thus, the industrial automation device 101 receives the first changeset with the first digital signature over a remote connection from the cloud service 103. For example, the first changeset with the first digital signature may be transported to the industrial automation device 101 over an ethernet connection.

At 206, the industrial automation device 101 verifies the first digital signature of the first changeset based on the pre-stored public key corresponding to the private key that was used to generate the first digital signature at the cloud service 103. In this case, the verification is successful.

At 207, the industrial automation device 101 obtains an approval for applying the first changeset in response to verifying the first digital signature of the first changeset.

For example, the approval may be obtained by finding a pre-stored approval token corresponding to the first changeset. The approval token is a unique token or code that is used to authorize a specific action, such as applying the first changeset. For example, the approval token may be used in situations where an individual or organization needs to grant pre-approval for applying the changeset (e.g., in case no user is present to manually provide the approval).

As another example, the approval may be obtained by receiving a user input indicating the approval. For example, prior to receiving the user input indicating the approval, the industrial automation device 101 may store the first changeset to a list monitorable by a user interface, and the user may then evaluate the first changeset via the user interface and provide the user input indicating the approval. The first changeset may be stored to the list in response to not finding the pre-stored approval token.

For example, the user interface may refer to a human-machine interface (HMI). Some examples of the user interface include but are not limited to: a control panel, a mobile application, a personal computer (PC) tool, a control system, or a data model, which provides a browsable set or array or list of changeset objects with metadata, each having a method to execute.

At 208, the industrial automation device 101 may store, in an event log, information indicating at least the approval for applying the first changeset. The event log is a record of events that have occurred within the industrial automation device 101. For example, the event log may comprise a chronological record of events that captures information such as the time the event occurred, the source of the event, and the details of the event itself. The approval is one example of an event. The event log may store information about changesets, such as approval, deletion, approval token list operations, as well as a direct local HMI control event log.

At 209, the industrial automation device 101 applies the first changeset at the industrial automation device 101 in response to obtaining the approval. Applying the first changeset means that the industrial automation device 101 modifies the configuration or the state of the industrial automation device 101 as indicated in the first changeset.

Figure 3:
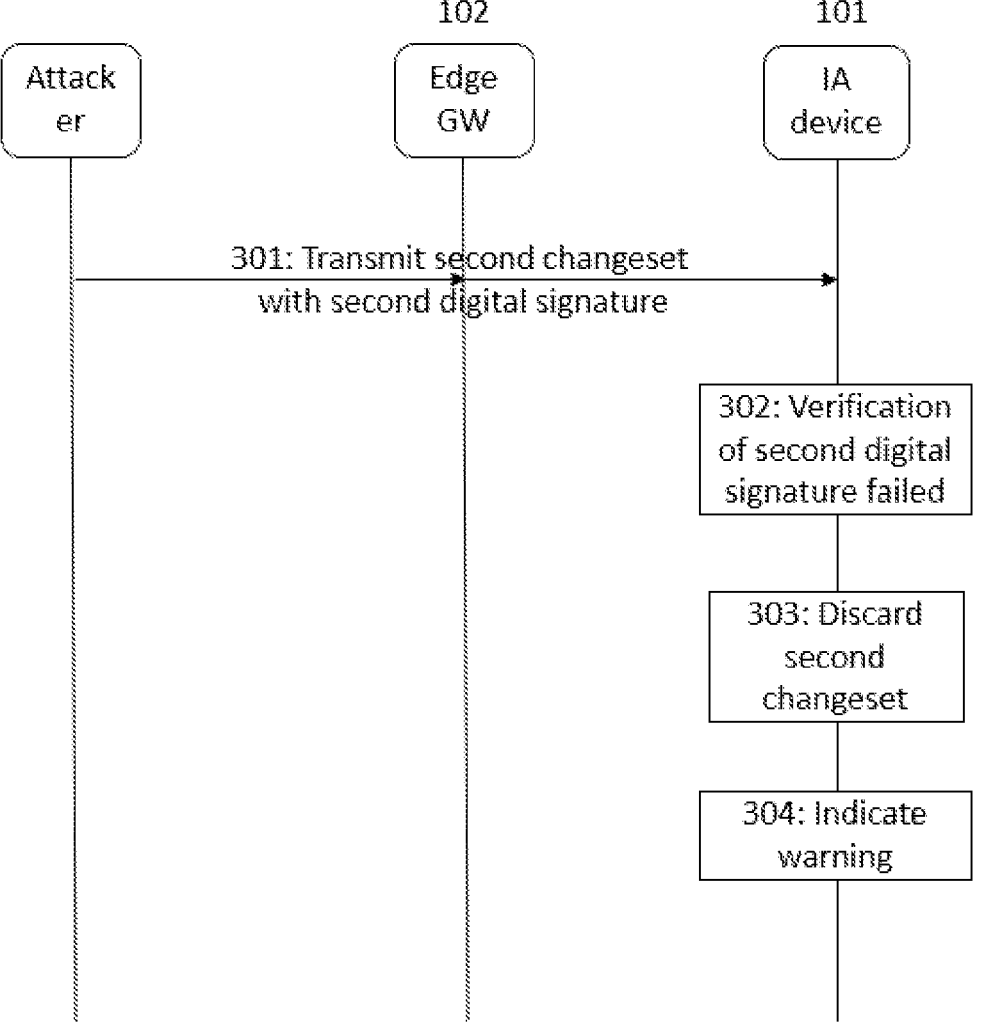
FIG. 3 illustrates a signal flow diagram.

FIG. 3 illustrates a signal flow diagram according to an example embodiment. The functions illustrated in FIG. 3 may be performed in addition to or as an alternative to the functions illustrated in FIG. 2.

Referring to FIG. 3, at 301, an attacker transmits, to the industrial automation device 101, a second changeset with a second digital signature, wherein the second changeset comprises a data package for modifying a configuration or a state of the industrial automation device 101.

The second changeset may be different to the first changeset transmitted from the cloud service 103, and the second digital signature may be different to the first digital signature of the first changeset. For example, the second changeset may comprise a harmful configuration that would damage the industrial automation device 101, if applied. The attacker may transmit the second changeset to the industrial automation device 101 directly or via the edge gateway 102.

The attacker is an individual or entity that attempts to compromise the security of a cryptographic system. This can include attempting to intercept or modify encrypted messages, or attempting to gain access to private keys or other sensitive information. In other words, the attacker is an entity different to the cloud service 103.

For example, the attacker may attempt to perform a man-in-the-middle attack, which involves intercepting messages (e.g., the first changeset) between the cloud service 103 and the industrial automation device 101, and altering them in transit, which would allow the attacker to read or modify the contents of the message. However, because the attacker does not have access to the private key of the cloud service 103, the attacker is unable to decrypt the message and read its contents. This effectively prevents the attacker from being able to view or modify the message (e.g., the first changeset).

At 302, the industrial automation device 101 attempts to verify the second digital signature of the second changeset based on the pre-stored public key corresponding to the private key stored at the cloud service 103. However, in this case, the verification fails, since the attacker was not able to use the private key of the cloud service 103 for generating the second digital signature. In other words, the second digital signature is not valid.

At 303, the industrial automation device 101 discards the second changeset in response to failing to verify the second digital signature of the second changeset. In other words, in this case, the industrial automation device 101 does not apply the second changeset at the industrial automation device 101.

At 304, the industrial automation device 101 may indicate a warning in response to failing to verify the second digital signature of the second changeset.

For example, the industrial automation device 101 may indicate the warning to a user as a warning message on a display of a user interface.

As another example, the industrial automation device 101 may indicate the warning by producing an audible or visual alarm, such as a beep or flashing light, to get the user's attention.

As another example, the industrial automation device 101 may indicate the warning by disabling itself or preventing it from performing further actions until the issue with the failed verification is resolved. This would help to ensure that the industrial automation device 101 does not continue to operate with potentially compromised configuration data.

Figure 4:
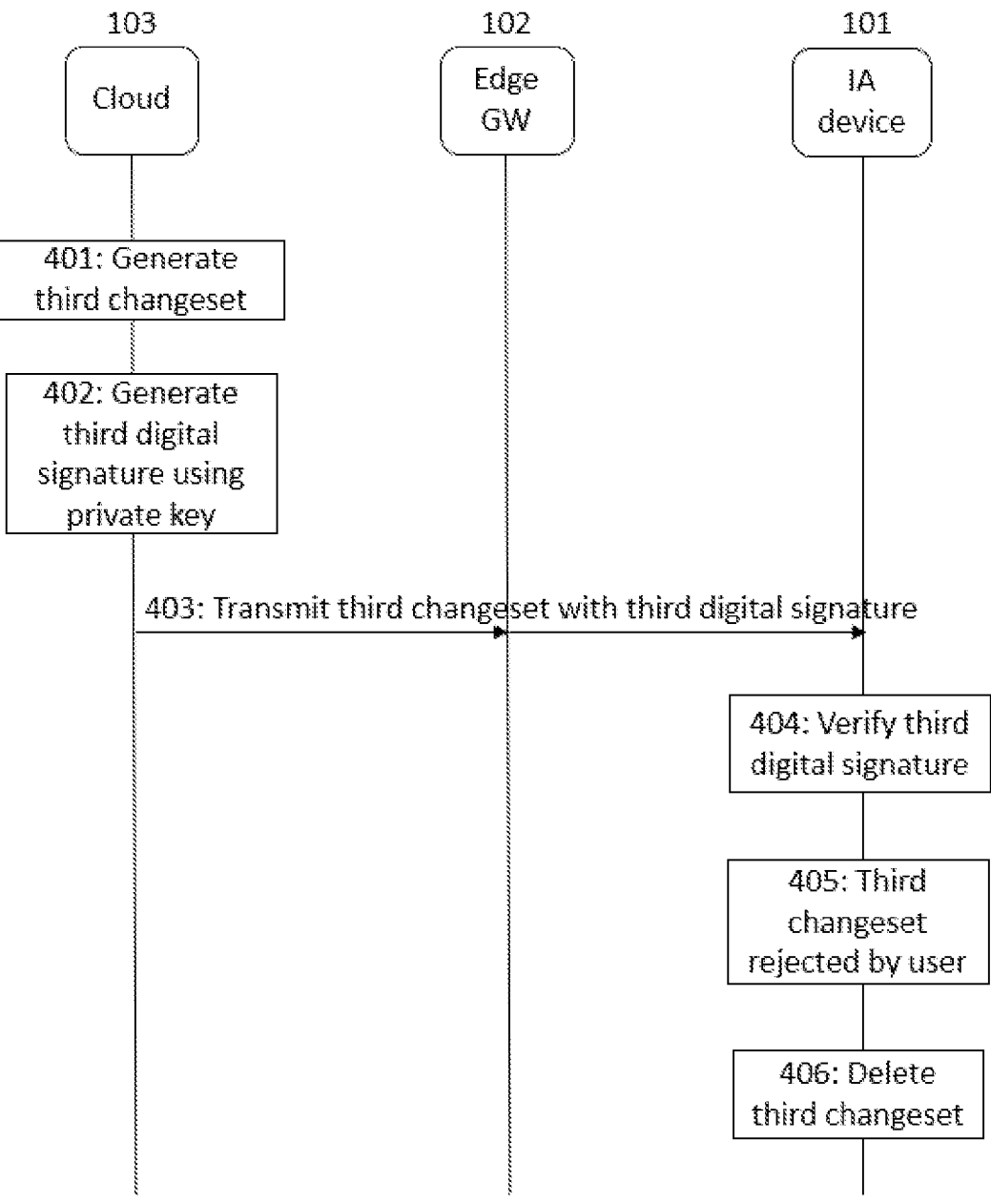
FIG. 4 illustrates a signal flow diagram.

FIG. 4 illustrates a signal flow diagram according to an example embodiment. The functions illustrated in FIG. 4 may be performed in addition to or as an alternative to the functions illustrated in FIG. 2 and/or FIG. 3.

Referring to FIG. 4, at 401, the cloud service 103 generates a third changeset for the industrial automation device 101, wherein the third changeset comprises a data package for modifying a configuration or a state of the industrial automation device 101.

At 402, the cloud service 103 generates a third digital signature for the third changeset using the private key stored at the cloud service 103. In other words, the third changeset is signed with the private key. As mentioned above, the public key corresponding to the private key is stored at the industrial automation device 101.

The third changeset may be different to the first changeset transmitted from the cloud service 103 in FIG. 2, and the third digital signature may be different to the first digital signature of the first changeset.

At 403, the cloud service 103 transmits the third changeset with the third digital signature to the industrial automation device 101 via the edge gateway 102. In other words, the cloud service 103 transmits the third changeset with the third digital signature to the edge gateway 102 connected to the cloud service 103, and the edge gateway 102 transmits the third changeset with the third digital signature to the industrial automation device 101. Thus, the industrial automation device 101 receives the third changeset with the third digital signature over a remote connection from the cloud service 103. For example, the third changeset with the third digital signature may be transported to the industrial automation device 101 over an ethernet connection.

At 404, the industrial automation device 101 verifies the third digital signature of the third changeset using the pre-stored public key corresponding to the private key that was used to generate the third digital signature at the cloud service 103. In this case, the verification is successful.

At 405, the industrial automation device 101 attempts to obtain an approval for applying the third changeset in response to verifying the third digital signature of the third changeset. For example, the industrial automation device 101 may store the third changeset to a list monitorable by a user interface. However, in this case, the industrial automation device 101 receives, via the user interface, a user input indicating a rejection of the third changeset. In other words, the industrial automation device 101 fails to obtain the approval.

At 406, the industrial automation device 101 deletes the third changeset in response to receiving the user input indicating the rejection of the third changeset. In other words, the industrial automation device 101 does not apply the third changeset in this case.

Herein the terms "first changeset", "second changeset", and "third changeset" are used to distinguish the changesets, and they do not necessarily mean a specific order of the changesets. Similarly, the terms "first digital signature", "second digital signature", and "third digital signature" are used to distinguish the digital signatures, and they do not necessarily mean a specific order of the digital signatures.

Figure 5:
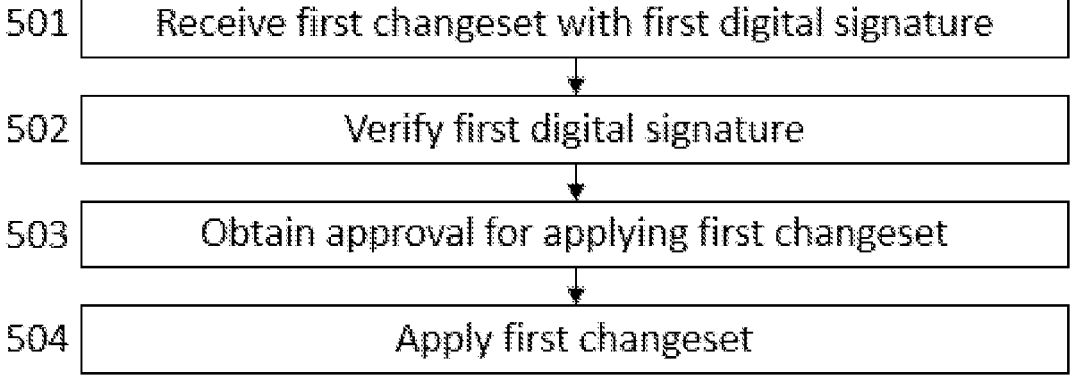
FIG. 5 illustrates a flow chart.

FIG. 5 illustrates a flow chart according to an example embodiment of a method performed by an apparatus such as, or comprising, or comprised in, an industrial automation device 101. The industrial automation device 101 may be, for example, a variable speed drive or any other industrial automation device.

Referring to FIG. 5, in block 501, the industrial automation device receives a first changeset with a first digital signature generated using a private key, wherein the first changeset comprises a data package for modifying a configuration or a state of the industrial automation device.

For example, the first changeset with the first digital signature may be received over a remote connection from a cloud service 103. The first changeset with the first digital signature may be received via an edge gateway 102 connected to the cloud service 103.

In block 502, the industrial automation device verifies the first digital signature of the first changeset based on a pre-stored public key corresponding to the private key.

In block 503, the industrial automation device obtains an approval for applying the first changeset in response to verifying the first digital signature of the first changeset, wherein the approval is obtained by finding a pre-stored approval token corresponding to the first changeset, or by receiving a user input indicating the approval.

Prior to receiving the user input indicating the approval, the industrial automation device may store the first changeset to a list monitorable by a user interface, and the user may then evaluate the first changeset via the user interface and provide the user input indicating the approval. For example, the user interface may refer to a human-machine interface (HMI). The first changeset may be stored to the list in response to not finding the pre-stored approval token.

The industrial automation device may store, in an event log, information indicating at least the approval for applying the first changeset.

In block 504, the industrial automation device applies the first changeset in response to obtaining the approval.

The industrial automation device may receive a second changeset with a second digital signature, and discard the second changeset in response to failing to verify the second digital signature of the second changeset. The industrial automation device may indicate a warning in response to failing to verify the second digital signature of the second changeset.

The industrial automation device may receive a third changeset with a third digital signature generated using the private key. The industrial automation device may verify the third digital signature of the third changeset using the pre-stored public key corresponding to the private key. The industrial automation device may receive a user input indicating a rejection of the third changeset. The industrial automation device may delete the third changeset in response to receiving the user input indicating the rejection.

Figure 6:
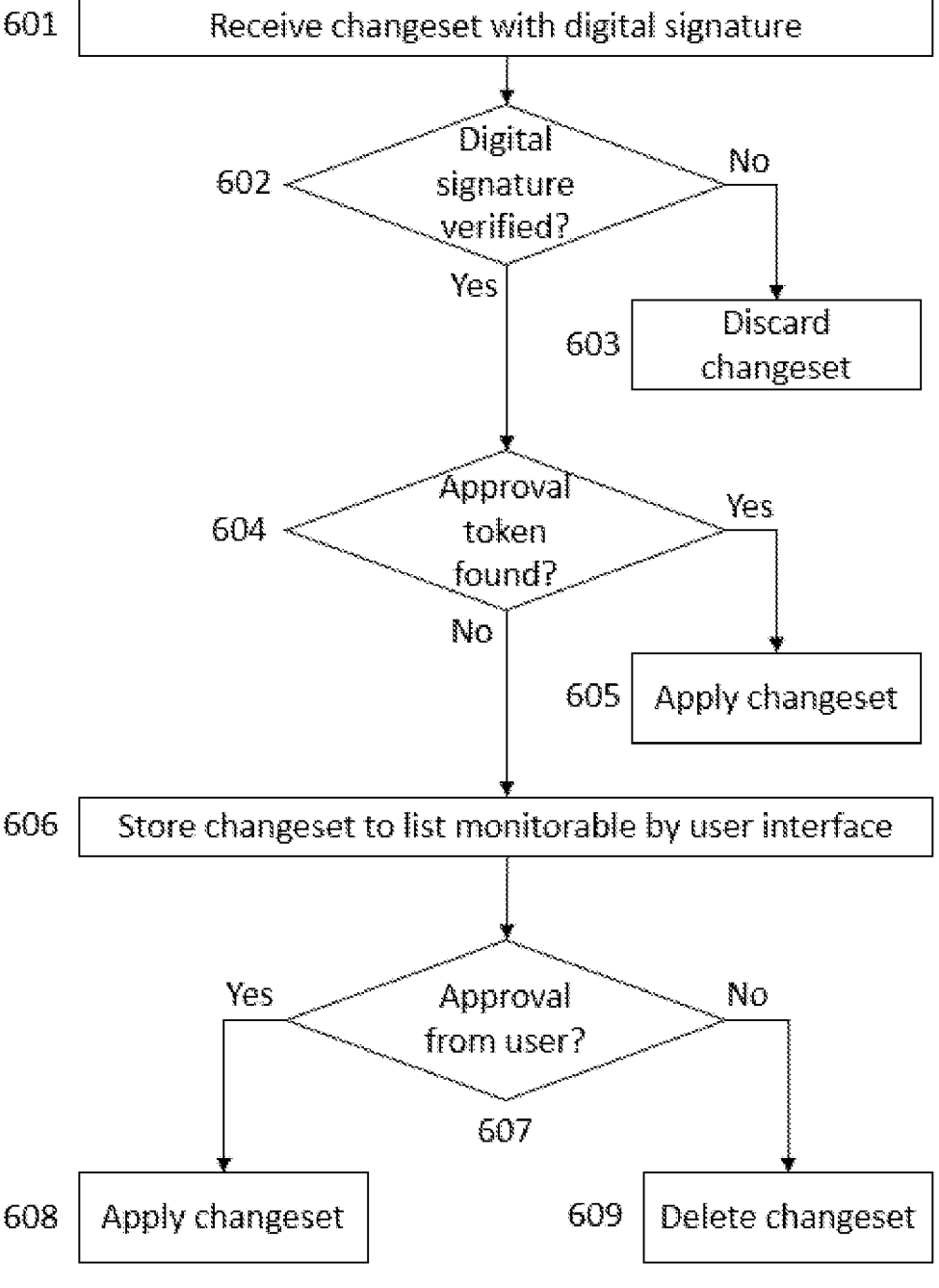
FIG. 6 illustrates a flow chart.

FIG. 6 illustrates a flow chart according to an example embodiment of a method performed by an apparatus such as, or comprising, or comprised in, an industrial automation device 101. The industrial automation device may be, for example, a variable speed drive or any other industrial automation device.

FIG. 6 illustrates an example of an approval flow for approving a changeset. The actual command approval flow may happen inside the firmware of the industrial automation device 101. Digital signatures can be used to verify the origin of proposed changesets. Pre-approval tokens can be set up for example for remote sites where no user is present. This way, configuration suggestions can be made through the cloud service even when there is no user at the site, where the industrial automation device is located. Alternatively, the approval can be done for example from a control room by the local user of the industrial automation device, for example by using a PC tool, mobile application, or external Supervisory Control and Data Acquisition (SCADA) system, or by a service engineer during a local visit at the site.

Referring to FIG. 6, in block 601, the industrial automation device receives a changeset with a digital signature generated using a private key, wherein the changeset comprises a data package for modifying a configuration or a state of the industrial automation device. The changeset may refer to, for example, the first changeset, or the second changeset, or the third changeset mentioned above.

For example, the changeset with the digital signature may be received over a remote connection from a cloud service 103. The changeset with the digital signature may be received via an edge gateway 102 connected to the cloud service 103. For example, the industrial automation device may receive the changeset from the cloud service through a cloud-specific application programming interface (API).

In block 602, the industrial automation device attempts to verify the digital signature of the changeset based on a pre-stored public key corresponding to the private key.

In block 603, if the industrial automation device fails to verify the digital signature (block 602: no), then the industrial automation device discards the changeset without applying it.

Alternatively, in block 604, if the industrial automation device successfully verifies the digital signature (block 602: yes), then the industrial automation device attempts to find a pre-stored approval token corresponding to the changeset from a pre-approval token list. The approval token indicates a pre-approval for applying the changeset.

The approval tokens can be generated using a service, which creates a signed approval token that can be stored in a specific industrial automation device. The generated approval tokens are stored on the pre-approval token list. A user may manage, for example view, add, delete, or disable, approval tokens using a local user interface.

In block 605, if the pre-stored approval token is found (block 604: yes), then the industrial automation device applies the changeset, since the changeset is pre-approved. For example, the changeset may indicate a category (e.g., A, B, C or D) of the changeset, and if the category of the changeset matches with a pre-approved category in the pre-approval token list, then the approval token may be considered to be found. For example, if the changeset is associated with category A, and the pre-approval token list comprises a pre-stored approval token for category A, then the changeset is approved to be applied based on the pre-stored approval token associated with category A.

Alternatively, in block 606, if the pre-stored approval token is not found (block 604: no), then the industrial automation device stores the changeset to a list of changesets monitorable by a user interface. For example, if the changeset is associated with category C, and the pre-approval token list comprises pre-stored approval tokens for categories A, B, and D (but not C), then the pre-stored approval token is not found. In this case, an approval must be given over the user interface (e.g., HMI) through a local tool API before applying the changeset. If the changeset is not approved, it stays on the list until it is purged or rejected. Rejecting the changeset will in effect delete the changeset.

In block 607, in response to storing the changeset in the list, the industrial automation device receives a user input indicating an approval or a rejection for applying the changeset.

In block 608, if the industrial automation device has received a user input indicating the approval (block 607: yes), then the industrial automation device applies the changeset. In this case, the industrial automation device may store, in an event log, information indicating at least the approval for applying the changeset.

Alternatively, in block 609, if the industrial automation device has received a user input indicating a rejection of the changeset (block 607: no), then the industrial automation device deletes the changeset without applying it. In this case, the industrial automation device may store, in an event log, information indicating at least the rejection of the changeset and/or the deletion of the changeset. The event log may store information about changesets, such as approval, deletion, operations (e.g., view, add, delete, disable) of the pre-approval token list, as well as direct local HMI control event log.

A technical advantage provided by the example embodiments described above is that they may improve cyber security of applying changesets to an industrial automation device. For example, they may enable secure remote commissioning of industrial automation devices with zero-touch commissioning. Furthermore, they may provide IEC 62443-4-2 SL4 compliancy for remote access.

The blocks, related functions, and information exchanges (messages) described above by means of FIGS. 2-6 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 7:
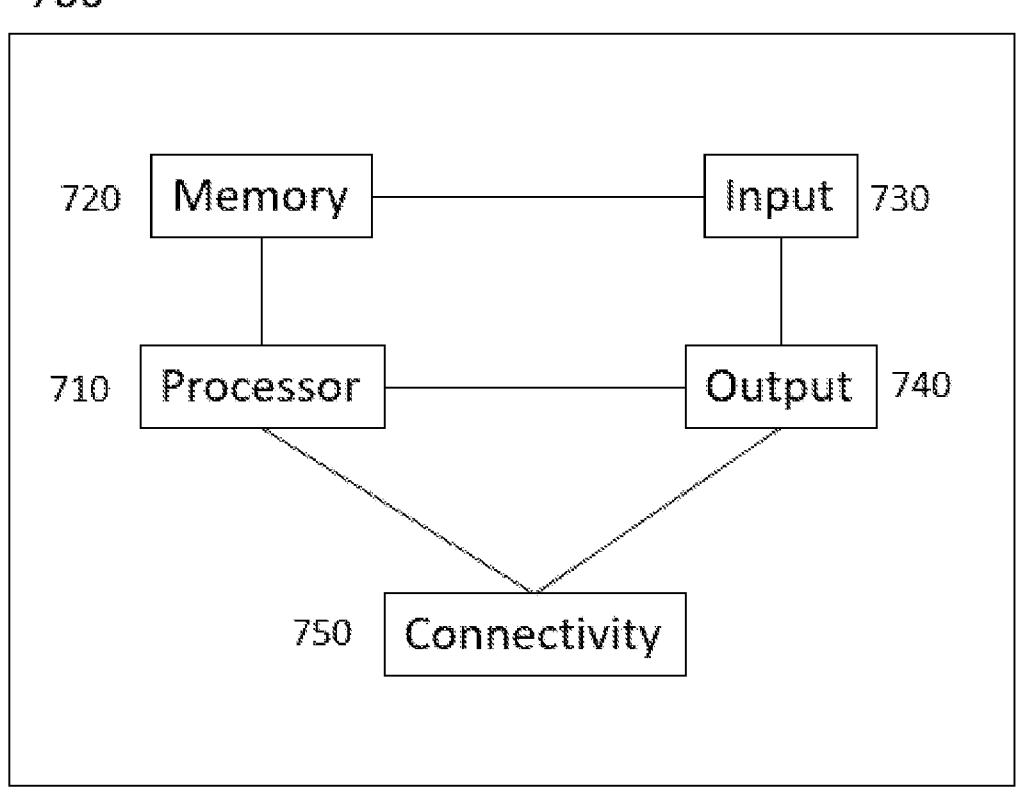
FIG. 7 illustrates an example of an apparatus.

FIG. 7 illustrates an example embodiment of an apparatus 700 comprising means for performing one or more of the example embodiments described above. The apparatus 700 may be, or comprise, or be comprised in, an industrial automation device 101. The industrial automation device may be, for example, a variable speed drive or any other industrial automation device.

The apparatus 700 may comprise a circuitry or a chipset applicable for realizing one or more of the example embodiments described above. For example, the apparatus 700 may comprise at least one processor 710. The at least one processor 710 interprets instructions (e.g., computer program instructions) and processes data. The at least one processor 710 may comprise one or more programmable processors. The at least one processor 710 may comprise programmable hardware with embedded firmware and may, alternatively or additionally, comprise one or more application-specific integrated circuits (ASICs).

The at least one processor 710 is coupled to at least one memory 720. The at least one processor is configured to read and write data to and from the at least one memory 720. The at least one memory 720 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 720 stores computer readable instructions that are executed by the at least one processor 710 to perform one or more of the example embodiments described above. For example, non-volatile memory stores the computer readable instructions, and the at least one processor 710 executes the instructions using volatile memory for temporary storage of data and/or instructions. The computer readable instructions may refer to computer program code.

The computer readable instructions may have been pre-stored to the at least one memory 720 or, alternatively or additionally, they may be received, by the apparatus, via an electromagnetic carrier signal and/or may be copied from a physical entity such as a computer program product. Execution of the computer readable instructions by the at least one processor 710 causes the apparatus 700 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 700 may further comprise, or be connected to, an input unit 730. The input unit 730 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 730 may comprise an interface to which external devices may connect to.

The apparatus 700 may also comprise an output unit 740. The output unit may comprise or be connected to one or more displays capable of rendering visual content, such as a light emitting diode (LED) display, a liquid crystal display (LCD) and/or a liquid crystal on silicon (LCoS) display. The output unit 440 may further comprise one or more audio outputs. The one or more audio outputs may be for example loudspeakers.

The apparatus 700 further comprises a connectivity unit 750. The connectivity unit 750 enables wired and/or wireless connectivity to one or more external devices. The connectivity unit 750 may comprise at least one transmitter and at least one receiver that may be integrated to the apparatus 700 or that the apparatus 700 may be connected to. The at least one transmitter comprises at least one transmission antenna, and the at least one receiver comprises at least one receiving antenna. The connectivity unit 750 may comprise an integrated circuit or a set of integrated circuits that provide the communication capability for the apparatus 700. Alternatively, the connectivity may be a hardwired application-specific integrated circuit (ASIC). The connectivity unit 750 may also provide means for performing at least some of the blocks or functions of one or more example embodiments described above. The connectivity unit 750 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 700 may further comprise various components not illustrated in FIG. 7. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An industrial automation device comprising at least one processor, and at least one memory storing instructions which, when executed by the at least one processor, cause the industrial automation device at least to:

receive a first changeset with a first digital signature generated using a private key, wherein the first changeset includes a data package for modifying a configuration or a state of the industrial automation device, and wherein the first changeset indicates a category of the first changeset;

verify the first digital signature of the first changeset based on a pre-stored public key corresponding to the private key;

attempt, in response to verifying the first digital signature of the first changeset, to find a pre-stored approval token corresponding to the category of the first changeset from a pre-approval token list; and apply the first changeset in response to finding the pre-stored approval token;

wherein the pre-stored approval token indicates a pre-approval for applying changesets associated with the category.

2. The industrial automation device of claim 1, further being caused to:

store the first changeset to a list monitorable by a user interface.

3. The industrial automation device of claim 2, being caused to store the first changeset to the list in response to not finding the pre-stored approval token corresponding to the first changeset.

4. The industrial automation device of claim 1, further being caused to:

store, in an event log, information indicating at least the approval for applying the first changeset.

5. The industrial automation device of claim 1, wherein the first changeset with the first digital signature is received over a remote connection from a cloud service.

6. The industrial automation device of claim 5, wherein the first changeset with the first digital signature is received via an edge gateway connected to the cloud service.

7. The industrial automation device of claim 1, further being caused to:

receive a second changeset with a second digital signature; and discard the second changeset in response to failing to verify the second digital signature of the second changeset.

8. The industrial automation device of claim 7, further being caused to:

indicate a warning in response to failing to verify the second digital signature of the second changeset.

9. The industrial automation device of claim 1, further being caused to:

receive a third changeset with a third digital signature generated using the private key;

verify the third digital signature of the third changeset using the pre-stored public key corresponding to the private key;

receive a user input indicating a rejection of the third changeset; and delete the third changeset in response to receiving the user input indicating the rejection.

10. The industrial automation device of claim 1, wherein the industrial automation device is a variable speed drive.

11. A method comprising:

receiving, by an industrial automation device, a first changeset with a first digital signature generated using a private key, wherein the first changeset includes a data package for modifying a configuration or a state of the industrial automation device, and wherein the first changeset indicates a category of the first changeset;

verifying, by the industrial automation device, the first digital signature of the first changeset based on a pre-stored public key corresponding to the private key;

attempting, in response to verifying the first digital signature of the first changeset, to find a pre-stored approval token corresponding to the category of the first changeset from a pre-approval token list; and applying, by the industrial automation device, the first changeset in response to finding the pre-stored approval token;

wherein the pre-stored approval token indicates a pre-approval for applying changesets associated with the category.

12. A non-transitory computer readable medium comprising program instructions for causing an industrial automation device to perform at least the following:

receiving a first changeset with a first digital signature generated using a private key, wherein the first changeset includes a data package for modifying a configuration or a state of the industrial automation device, and wherein the first changeset indicates a category of the first changeset;

verifying the first digital signature of the first changeset based on a pre-stored public key corresponding to the private key;

attempting, in response to verifying the first digital signature of the first changeset, to find a pre-stored approval token corresponding to the category of the first changeset from a pre-approval token list; and applying the first changeset in response to finding the pre-stored approval token;

wherein the pre-stored approval token indicates a pre-approval for applying changesets associated with the category.

13. A system comprising; at least a cloud service, an edge gateway, and an industrial automation device;

wherein the cloud service is configured to:

generate a first changeset for the industrial automation device, wherein the first changeset includes a data package for modifying a configuration or a state of the industrial automation device, and wherein the first changeset indicates a category of the first changeset;

generate a first digital signature for the first changeset using a private key; and transmit, to the edge gateway, the first changeset with the first digital signature;

wherein the edge gateway is configured to:

receive, from the cloud service, the first changeset with the first digital signature; and transmit, to the industrial automation device, the first changeset with the first digital signature;

wherein the industrial automation device is configured to:

receive, from the edge gateway, the first changeset with the first digital signature;

verify the first digital signature of the first changeset based on a pre-stored public key corresponding to the private key;

attempt, in response to verifying the first digital signature of the first changeset, to find a pre-stored approval token corresponding to the category of the first changeset from a pre-approval token list; and apply the first changeset in response to finding the pre-stored approval token;

wherein the pre-stored approval token indicates a pre-approval for applying changesets associated with the category.

* * * * *